United States Patent [19]

Cichy

[11] 4,304,954
[45] Dec. 8, 1981

[54] APPARATUS FOR CASTING FUSED REFRACTORY OXIDES HAVING HIGH MELTING POINTS

[75] Inventor: Paul Cichy, Buffalo, N.Y.

[73] Assignee: Kennecott Corporation, Stamford, Conn.

[21] Appl. No.: 45,485

[22] Filed: Jun. 4, 1979

[51] Int. Cl.³ .......................... F27B 3/06; F27D 3/15
[52] U.S. Cl. .......................................... 13/33; 13/10
[58] Field of Search ............... 13/10, 33, 32; 432/157, 432/263

[56] References Cited

U.S. PATENT DOCUMENTS

| | | |
|---|---|---|
| 1,229,494 | 6/1917 | Marfield . |
| 2,290,028 | 7/1942 | Brooke ................. 13/10 X |
| 2,790,019 | 4/1957 | Stalego ..................... 13/33 |
| 3,752,895 | 8/1973 | Clishem et al. ............ 13/10 |
| 4,097,032 | 6/1978 | Mauritz ................. 266/230 |

*Primary Examiner*—R. N. Envall, Jr.
*Attorney, Agent, or Firm*—William H. Holt; Raymond W. Green; Donald C. Studley

[57] ABSTRACT

The present invention provides a process and apparatus for the production of refractory oxide materials having high fusion points. By high fusion points is meant melting points greater than 2400° C.

The process of the present invention comprises the steps of:

(a) insulatingly supporting a vertically elongated bed of particulate refractory oxide material having a high fusion point at its bottom and sides with additional amounts of the particulate refractory oxide which will remain unmelted through the process, (b) exposing the upper surface of the bed to a plurality of electrodes to form at least one arc adjacent to the upper surface of the bed, (c) melting a portion of the bed by the flow of electric current from one electrode to another, forming a zone of liquid refractory oxide material, or bath, surrounded by a layer of congealed material, or skull, (d) removing a portion of particulate material along the side of the bed to expose the congealed layer at a point adjacent the bottom portion of the zone of liquid material, (e) piercing the congealed layer and tapping the zone of liquid material, and (f) tilting the bed to pour molten refractory oxide material from said liquid zone to a point outside of the bed.

The present invention also provides a furnace for the production of fused refractory oxide materials having high fusion points. The apparatus comprises:

(a) a furnace shell having a bottom and at least one side wall adapted to receive and contain a charge of the refractory material, (b) the side wall of the shell having a vertical notch, or slit, therein extending from the top of the wall downward to a distance at least ⅔ of the total height of the shell, (c) the notch adapted to be sealed by a removable closure means and, when unsealed, to receive a tapping means, such as a ram or a jet tapper, (d) a pouring spout positioned adjacent the notch, extending outward from the shell, (e) means to heat the interior portion of the shell, and (f) means to tilt the shell to an angle from about 5° to about 90° from the initial, at rest, position.

7 Claims, 5 Drawing Figures

APPARATUS FOR CASTING FUSED REFRACTORY OXIDES HAVING HIGH MELTING POINTS

BACKGROUND OF THE INVENTION

The present invention relates to a process and apparatus for the casting of fused refractory oxide materials having high fusion points, such as magnesia. Such refractory oxide materials have melting points greater than about 2400° C. Many refractory oxide materials, such as alumina, have relatively low melting points and are commonly commercially produced on a continuous or semi-continuous basis by pouring or tapping the molten oxide from a furnace. However, such methods have not been successfully employed with refractory oxides having melting points over about 2400° C. because the fluidity of such material decreases at a very rapid rate with a small decrease in temperature, causing the material to solidify in the furnace or to a great extent during pouring before any significant amount of product can be poured or drawn from a tap.

The present method and apparatus are particularly adapted to the production of fused magnesia (MgO). The melting point of magnesia is about 2800° C. Fused magnesia is typically commerically produced by batch processes using electric arc furnaces of the open arc type from feed material of calcined magnesia or magnesite having a high MgO content.

Conventionally fused magnesia is produced by placing a metal container, suitably a steel shell, partially filled with a bed of feed material, such as calcined magnesia, under a set of graphite or carbon electrodes. A bridge of carbon or graphite, suitably in the form of resistor bars, is positioned in the bed to form an electrical connection, or bridge, between the electrodes when they are lowered. Current passing through the bridge causes local heating and subsequently the formation of an initial molten oxide pool. When the pool is of a size sufficient to conduct electric current by itself, the electrodes are moved to a position sufficiently close to the surface of the pool so that electric current passes through the arc to the molten pool. The container is filled by gradually feeding additional feed material in the area of the molten bath. As the molten area increases in size, a surrounding layer of feed material congeals to form a container for the fused magnesia. This layer is generally termed the "skull". Between the skull and the sides of the container, a second layer of partly solidified material is formed, which, in turn, is surrounded by a layer of substantially unaffected feed material. The skull layer and the surrounding layers of unfused feed material serve to insulate the shell from the high temperatures of the bath. To further cool the shell, water is sprayed on the outside portions during the fusion operation and, if desired, during the cooling stage.

Typically, fused magnesia is formed, in situ, by allowing the contents of the furnace to cool sufficiently to solidify the bath. The fused magnesia product, usually in the form of a large mass, generally referred to as a "pig", is removed from the furnace after cooling by chipping with pnuematic hammers or, more frequently, by dumping the furnace contents on a sorting floor and separating the product from the congealed material and the unfused material. The congealed material and the unfused material are recovered and utilized as feed material in subsequent fusions. The pig is broken into smaller pieces as a feed material for a crusher or a subsequent milling operation. The product, granules or grains of fused magnesia, is useful in the production of shaped refractory materials by being bonded together, with or without additional refractory materials, shaped and fired. The particulate product is also useful as an electrical insulator material in tubular heating elements, such as those used in electric stoves, water heaters, cooking pots and frying pans.

The working of the pig, i.e., separating and breaking the pig to obtain pieces suitable for crushing, is time-consuming and requires a substantial amount of arduous labor.

The present invention provides a method and apparatus for the semi-continuous production of a cast, fused magnesia product. The term "semi-continuous" means that more than one run, or pour, of fused magnesia may be produced from a furnace without removal of the skull from the furnace. The cast product may be produced in a thin layer having a relatively smooth surface, particularly adapted to being easily fractured into pieces suited to crushing and requires no separation of fused from unfused material.

BRIEF DESCRIPTION OF THE INVENTION

The present invention provides a process and apparatus for the production of fused refractory oxide material having high melting or fusion points. By high fusion points is meant melting points greater than 2400° C.

The process of the present invention comprises the steps of:

(a) insulatingly supporting a vertically elongated bed of particulate refractory oxide material having a high fusion point at its bottom and sides with additional amounts of the particulate refractory oxide which will remain unmelted through the process, (b) exposing the upper surface of the bed to a plurality of electrodes to form at least one arc adjacent to the upper surface of the bed, (c) melting a portion of the bed by the flow of electric current from one electrode to another, forming a zone of liquid refractory oxide material, or bath, surrounded by a layer of congealed material, or skull, (d) removing a portion of particulate material along the side of the bed to expose the congealed layer at a point adjacent the bottom portion of the zone of liquid material, (e) piercing the congealed layer and tapping the zone of liquid material, and (f) tilting the bed to pour molten refractory oxide material from said liquid zone to a point outside of the bed.

The present invention also provides a furnace for the production of fused refractory oxide materials having high fusion points. The apparatus comprises:

(a) a furnace shell having a bottom and at least one side wall adapted to receive and contain a charge of the refractory material, (b) the side wall of the shell having a vertical notch, or slit, therein extending from the top of the wall downward to a distance at least ⅔ of the total height of the shell, (c) the notch adapted to be sealed by a removable closure means and, when unsealed, to receive a tapping means, such as a ram or a jet tapper, (d) a pouring spout positioned adjacent the notch, extending outward from the shell, (e) means to heat the interior portion of the shell, and
(f) means to tilt the shell to an angle from about 5° to about 90° from the initial vertical, or at rest, position.

DETAILED DESCRIPTION OF THE INVENTION

The present invention will be further illustrated and described in detail by reference to the accompanying drawings and the following examples which are to be considered illustrative of the invention and not limiting.

Figure 1:
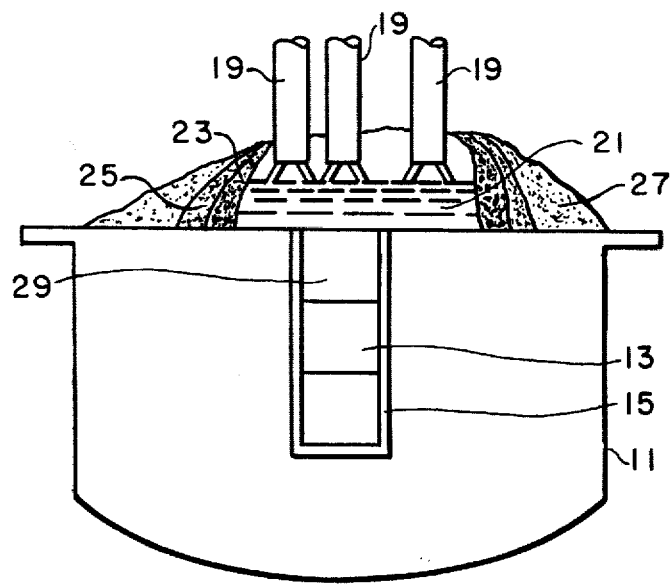
FIG. 1 is a side view, partly in section, of a furnace of the present invention.
Figure 2:
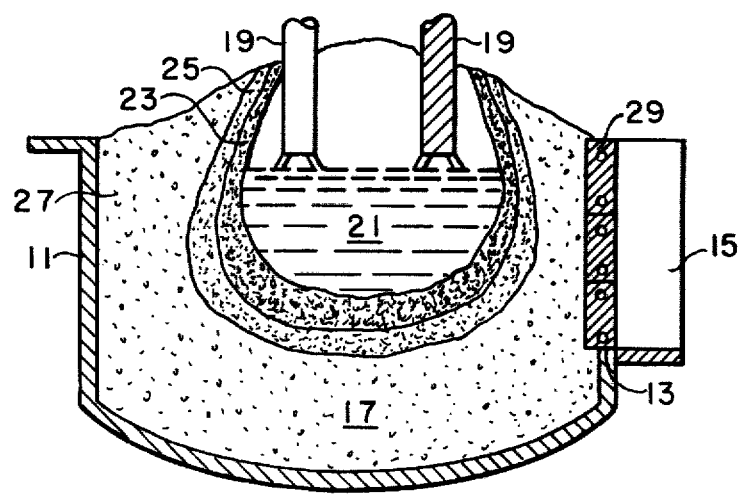
FIG. 2 is a frontal view, partly in section, of the furnace of FIG. 1.
Figure 3:
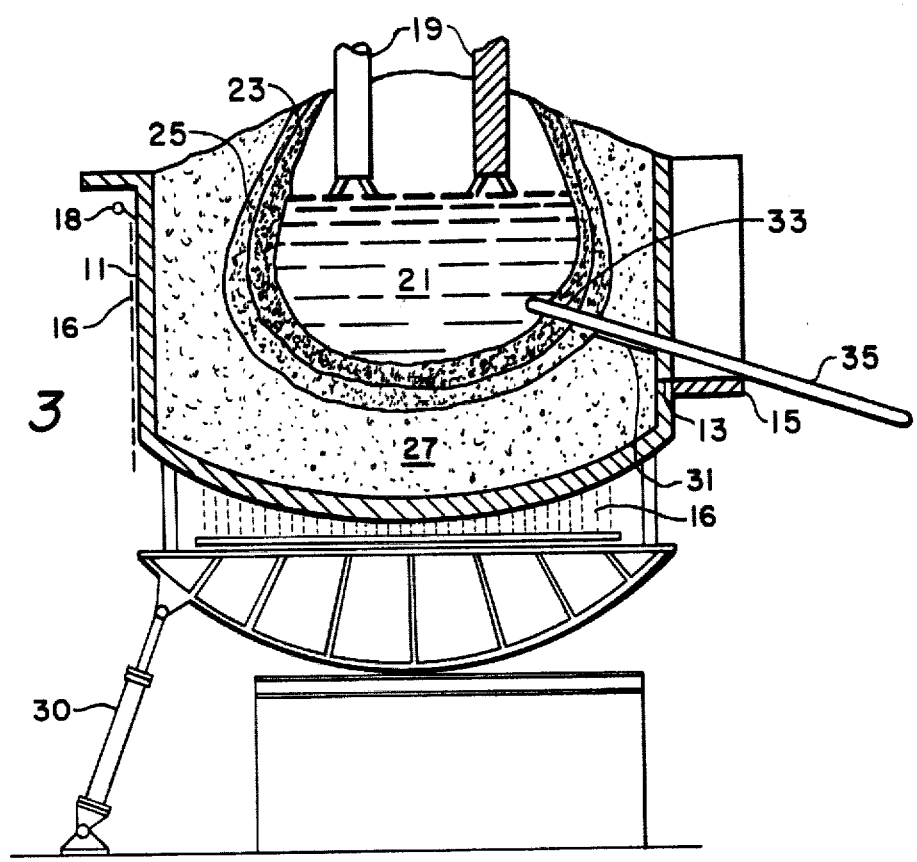
FIG. 3 is a frontal view, partly in section, of the furnace of FIG. 1 being tapped.

Looking now at FIGS. 1 through 3, the furnace is comprised of a metal shell 11, suitably of steel, having an elongated notch, or slit, 13 and a corresponding pouring spout 15, positioned adjacent notch 13 and extending outward from the side wall of shell 11. The outside and bottom of shell 11 can be provided with exterior cooling means such as a water spray, 16, provided from cooling water ring 18 (see FIG. 3). The furnace contains a charge 17 of particulate refractory oxide material having a high melting or fusion point, e.g., magnesia, which has been heated by electrodes 19 positioned to heat the interior of the furnace and to form a bath, or zone, 21 of molten refractory oxide material. A skull layer 23 of solidified, or congealed, refractory oxide material is formed around the zone of liquid refractory oxide material. A secondary layer of partially sintered and partially fused refractory oxide material 25 is formed around the skull layer. The partially sintered layer, in turn, is surrounded by layer 27 of unmelted refractory oxide material. The vertical elongated bed of refractory oxide material is supported at its bottom and sides by metal shell 11 and, in turn, insulates shell 11 by layers 27, 25 and 23 of unmelted refractory oxide material. Elongated notch 13 is suitably sealed by a removable, water-cooled damming plate 29.

FIG. 3 illustrates the furnace being tapped and means 30 to tilt shell 11. Damming plate 29 has been removed from notch 13, and a portion of the unfused refractory oxide layers 27 and 25 adjacent notch 13 has been removed, and trench 31 formed in particulate charge layer 27 and partially sintered layer 25. A tap 33 is suitably made by a tapping means, such as a ram or a jet tapper using an explosive charge, both shown schematically as tapping means 35, penetrating skull layer 23 preferably adjacent the lower portion of notch 13.

Figure 4:
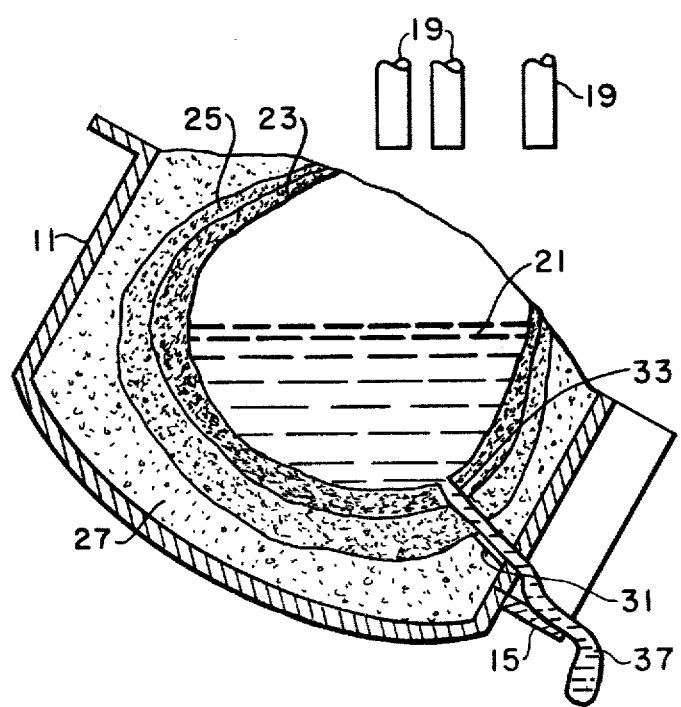
FIG. 4 is a frontal view, partly in section, showing the furnace of FIG. 1 in a pouring position.

FIG. 4 shows the tapped furnace of FIG. 3 tilted to cast a fused refractory oxide product. The furnace is tilted, by means 30, shown in FIG. 3, to an angle between about 5° and about 90° and, more preferably, between about 15° and about 60° from the original, vertical position, allowing molten refractory oxide material 37 to flow through tap 33 in skull 23, through trench 31 in layers 25 and 27 to a point outside furnace shell 11. Preferably, tilting is carried out as speedily as possible to produce a rapid flow of the molten refractory oxide material before solidification.

Figure 5:
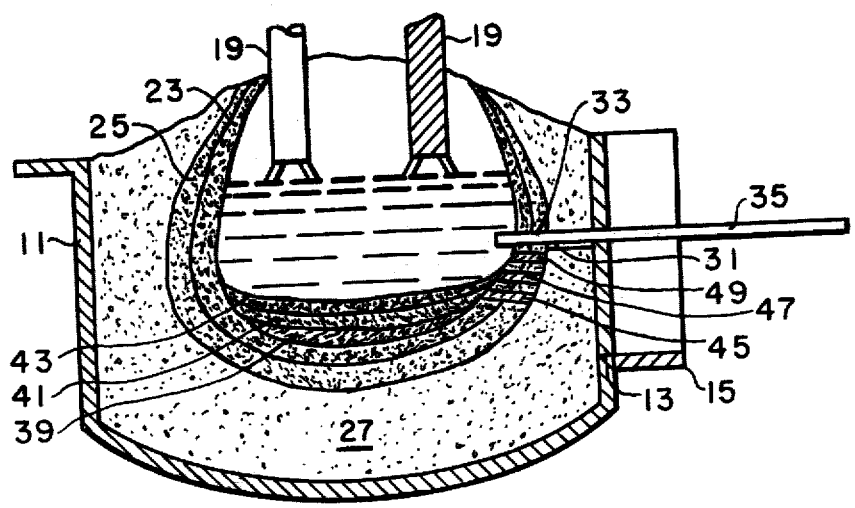
FIG. 5 is a frontal view, partly in section, showing the furnace of FIG. 1 being tapped after several previous tappings.

FIG. 5 shows the furnace of the previous drawings being tapped after several previous tappings. As in FIG. 3, damming plate 29 and a portion of the unfused refractory oxide layers 25 and 27 have been removed and trench 31 formed therein. As shown, the residues 39, 41 and 43 from previous tappings 45, 47 and 49 require that each new tapping be placed progressively higher within notch 13. Suitably, the tappings are carried out at angles progressively upward, that is, greater from horizontal, to insure tapping the molten zone within the furnace and to avoid any previous taps and any bottom build up of solidified refractory oxide material, such as 39, 41 and 43, which may have been formed within the zone of liquid refractory oxide material from previous pours.

EXAMPLE I

A 24 inch diameter steel shell furnace similar to that shown in FIG. 1 was equipped with two 4-inch diameter graphite electrodes adapted to operate at a voltage of 82 volts. The center to center distance of the electrodes was 9 inches.

The furnace was filled ¾ full with calcined magnesia and the melt started by means of a graphite starting bar with the electrodes pulled close together. After getting a melt and an average energy input of at least 100 KW, the electrodes were pulled apart.

Thirty minutes after the start, a full energy input of 150 KW was attained, and the furnace operated at this level for one hour. At this point, the furnace was slightly inclined at an angle of about 15°, and a portion of the loose charge and partly congealed material removed to expose the skull layer. A "V" shaped trench was made in the loose charge and partly congealed layer to form a path for the molten magnesia. A 1½ inch diameter, eight foot long steel rod was used as a tapping ram to pierce the skull layer. The ram was removed and the furnace tilted to an angle of 60° to remove molten magnesia from the furnace.

EXAMPLE II

In this example a 900 KW average input single phase arc furnace having two 14 inch diameter electrodes was used. The center to center distance between the electrodes was 22 to 24 inches. The distance between the electrodes and the side wall of the furnace was about 10 inches. The furnace notch was sealed with magnesia brick, and the furnace was charged with calcined magnesia.

After an initial heating of about 2½ hours, the magnesia brick was removed, and a portion of the adjacent loose charge and partly congealed material removed to expose the skull layer. A trench was prepared in the remaining loose material and partly congealed material to receive the molten magnesia.

A steel rod 2 inches in diameter about 10 feed in length was used as a tapping ram. The ram was suspended by a wire rope to permit swinging the ram to acquire the necessary kinetic energy to pierce the skull layer. Piercing the skull required from 2 to 5 hits with the ram.

After piercing, the ram was quickly removed, and the furnace tilted to an angle of about 60° to pour the melt from the furnace and prevent solidification of magnesia in the tap hole and pouring spout.

After each pour, additional feed material was added to the furnace, and the tapping procedure was repeated at progressively higher points in the skull about every 2½ hours, yielding pours of from about 500 to about 800 pounds of fused magnesia. After the procedure was repeated 24 times, the bottom crust build-up became too thick to continue.

While there have been described various embodiments of the invention, the method and apparatus described is not intended to be understood as limiting the scope of the invention as it is realized that changes therewithin are possible, and it is intended that each element recited in any of the following claims is to be understood as referring to all equivalent elements for accomplishing the same results in substantially the same or equivalent manner, it being intended to cover the invention in whatever form its principle may be utilized.

What is claimed is:

1. A furnace for the production of fused refractory oxide materials having fusion points greater than 2400° C. comprising:
   (a) a furnace shell having a bottom and at least one side wall adapted to receive and contain a charge of the refractory material,
   (b) the side wall of said shell having a vertical notch therein extending from the top of the wall downward to a distance at least ⅔ of the total height of the shell,
   (c) the notch adapted to be sealed by a removable closure means and, when unsealed, to receive a tapping means,
   (d) a pouring spout positioned adjacent said notch, extending outward from said shell,
   (e) means to heat the interior portion of said shell, and
   (f) means to tilt said shell to an angle from about 5° to about 90° from the initial vertical position.
2. The furnace of claim 1 wherein the shell is steel.
3. The furnace of claim 1 wherein the tapping means is a ram.
4. The furnace of claim 1 wherein the tapping means is a jet tapper.
5. The furnace of claim 1 wherein the shell is provided with an exterior cooling means.
6. The furnace of claim 1 wherein the cooling means is a water spray.
7. The furnace of claim 1 wherein the tilting means is adapted to tilt the furnace to an angle from about 15° to about 60° from the initial vertical position.

* * * * *